United States Patent
Mondal et al.

(10) Patent No.: US 11,038,661 B1
(45) Date of Patent: Jun. 15, 2021

(54) SYSTEM AND METHOD FOR MANAGING INTERFERENCE IN LI-FI COMMUNICATION NETWORKS

(71) Applicant: Wipro Limited, Bangalore (IN)

(72) Inventors: Subhas Chandra Mondal, Bangalore (IN); Shailesh Prabhu, Manipal (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/774,002

(22) Filed: Jan. 28, 2020

(30) Foreign Application Priority Data

Dec. 11, 2019 (IN) .............................. 201941051271

(51) Int. Cl.
| H04B 10/08 | (2006.01) |
| H04B 17/00 | (2015.01) |
| H04L 5/00 | (2006.01) |
| H04B 10/11 | (2013.01) |
| H04W 72/08 | (2009.01) |
| H04B 10/079 | (2013.01) |

(52) U.S. Cl.
CPC ..... *H04L 5/0073* (2013.01); *H04B 10/07953* (2013.01); *H04B 10/11* (2013.01); *H04L 5/0055* (2013.01); *H04L 5/0057* (2013.01); *H04W 72/082* (2013.01)

(58) Field of Classification Search
None
See application file for complete search history.

(56) References Cited

U.S. PATENT DOCUMENTS

| 8,412,103 B2 | 4/2013 | Srinivasan et al. |
| 9,876,770 B1 * | 1/2018 | Ekambaram .......... H04W 12/08 |

(Continued)

FOREIGN PATENT DOCUMENTS

| CA | 2826240 A1 | 8/2012 |
| CN | 101926139 A | 12/2010 |
| JP | 2009089361 A | 4/2009 |

OTHER PUBLICATIONS

Chowdhury, M., et al., "Integrated RF/Optical Wireless Networks for Improving QoS in Indoor and Transportation Applications", Wireless Personal Communications, 2018, vol. 107, pp. 1401-1430.

(Continued)

*Primary Examiner* — David C Payne
*Assistant Examiner* — Pranesh K Barua
(74) *Attorney, Agent, or Firm* — Finnegan, Henderson, Farabow, Garrett & Dunner, LLP

(57) ABSTRACT

A method and system for managing interference between a set of Light Fidelity (Li-Fi) access points is disclosed. The method includes receiving a plurality of uplink data frames. Each of the plurality of uplink data frames includes a response that includes one of an Acknowledgement (ACK) and a Negative Acknowledgment (NACK) for the associated downlink test frame and a Channel Quality Indication (CQI) for the associated Li-Fi access point. The method further includes detecting presence of the User Equipment (UE) in an interference region of the set of Li-Fi access points. The method includes attaching the UE with a first Li-Fi access point having the highest CQI and scheduling data transmission from the set of Li-Fi access points in a mutually exclusive time slot. The UE accepts data received from the attached Li-Fi access point and drops data received from remaining set of Li-Fi access points.

19 Claims, 13 Drawing Sheets

(56) References Cited

U.S. PATENT DOCUMENTS

| | | | | |
|---|---|---|---|---|
| 2010/0087221 | A1* | 4/2010 | Srinivasan | H04W 52/343 |
| | | | | 455/522 |
| 2019/0028193 | A1* | 1/2019 | Miras | H04B 10/1129 |
| 2019/0089457 | A1* | 3/2019 | Lynn | H04B 10/116 |
| 2019/0261239 | A1* | 8/2019 | Wang | H04W 36/30 |
| 2020/0195343 | A1* | 6/2020 | Solanki | H04W 88/16 |
| 2020/0195344 | A1* | 6/2020 | Jungnickel | H04L 27/2697 |

OTHER PUBLICATIONS

Jung, S.Y., et al., "Inter-cell interference mitigation in multicellular visible light communications", 2016, vol. 24, No. 8, 15 pages.
Martinez, E.R., et al., "Inter Cell Interference Coordination techniques in HETNETS, Almost Blank Sub-Frames approach", Universitat Politechnica de Catalunya, Jun. 2013, 53 pages.
Miras, D., et al., "A High Data Rate LiFi Integrated System with Inter-cell Interference Management", 2018 IEEE Wireless Communications and Networking Conference (WCNC), 6 pages.

\* cited by examiner

| Start Frame 502 | Cell ID 504 | Data 506 | Tracking Downlink 508 | End Frame 510 |

| Start Frame 602 | Cell ID 604 | UE ID 606 | CQI 608 | Tracking Uplink 610 | End Frame 612 |

| UE ID 1002 | Light Intensity (Lux) 1004 | Phase (φ) 1006 |
|---|---|---|
| 1 | 10 | φ1 |
| 1 | 20 | φ1 |
| 1 | 15 | φ1 |
| 1 | 30 | φ1, φ2 |
| 1 | 35 | φ1, φ2 |
| 1 | 32 | φ1, φ2 |
| 1 | 12 | φ3 |
| 1 | 20 | φ3 |
| 1 | 10 | φ3 |

SYSTEM AND METHOD FOR MANAGING INTERFERENCE IN LI-FI COMMUNICATION NETWORKS

TECHNICAL FIELD

This disclosure relates generally to Light Fidelity (Li-Fi) communication networks, and more particularly to a system and method for managing interference in Li-Fi communication networks.

BACKGROUND

The demand for wireless data communication is increasing at a very high rate, To keep up with this growing demand, the available Radio Frequency (RF) spectrum of below 10 GHz may not be sufficient. As an alternative, Optical Wireless Communication (OWC) involves communication over a light channel by a transmit-receive (transceiver) pair. The transceiver pair can transmit information using a Light Emitting Diode (LED) and receive information using a light sensor, such as, a photo diode or a camera. In Li-Fi, as defined in the IEEE standard 802.15.7, the transmitter transmits information using a single LED and the transmit information can be coded using various modulation techniques like On-Off Keying (OOK), Pulse Position Modulation (PPM), Color Shift Keying (CSK). The receiver side includes a photo detector to receive and decode the information.

The current OWC systems (for example, Li-Fi) lack the mechanism to overcome the interference caused by adjacent access points/transmit sources modulated using white light (single carrier). In the Li-Fi standard 802.15-7, under the VLC cell design and mobility support, the standard talks about the logical movement of a device from one cell to another, due to either interference or deliberate switching. The standard does not mention how to stay in the interference region and still be able to receive the transmit data. It does state about the interference caused by the ambient light but not due to the overlapping access points. The standard also talks about the beacon frame as a part of the super-frame used to discover the new devices that have come into the vicinity of the access points. However, there is no existing mechanism to transmit this beacon to discover the devices within the interference region.

When a user moves from one access point to another, the user connectivity persists as long as the user stays in the vicinity of the modulated light. If there is a region where modulated lights from adjacent access points interfere, the user will not be able to receive data in this interference region. In the current implementation of the OWC systems, there is no mechanism to overcome the interference caused by the overlapping access points, which are white light modulated using On-Off keying. There is no method to detect the physical cell IDs of the access points associated to the devices in the interference region. Interference management and multi-access in the overlapping region remains a key challenge in the OWC systems, where the mobility of a user is hindered by the interference of the overlapping access points in the vicinity.

SUMMARY

In one embodiment, a method for managing interference between a set of Light Fidelity (Li-Fi) access points in a Li-Fi communication network is disclosed. In one example, the method may include receiving, by an interference management device, a plurality of uplink data frames sent by a User Equipment (UE). Each of the plurality of uplink data frames includes a response to an associated downlink test frame received from an associated Li-Fi access point within the set of Li-Fi access points. The response includes one of an Acknowledgement (ACK) and a Negative Acknowledgment (NACK) for the associated downlink test frame and a Channel Quality Indication (CQI) for the associated Li-Fi access point based on the associated downlink test frame. The method may further include detecting, by the interference management device, presence of the UE in an interference region of the set of Li-Fi access points, based on presence of at least one NACK in at least one of the plurality of uplink frames received from the set of Li-Fi access points. The method may further include attaching, by the interference management device, the UE with a first Li-Fi access point from the set of Li-Fi access points. A CQI associated with the first Li-Fi access point is highest amongst the set of Li-Fi access points. The method may further include scheduling, by the interference management device, data transmission from the set of Li-Fi access points in a mutually exclusive time slot. The UE accepts data received from the attached Li-Fi access point and drops data received from remaining set of Li-Fi access points. The remaining set of Li-Fi access points does not include the first Li-Fi access point.

In another embodiment, a system for managing interference in a Li-Fi communication network is disclosed. In one example, the system may include a set of Li-Fi access points, a plurality of UEs, a processor, and a computer-readable medium communicatively coupled to the processor. The computer-readable medium may store processor instructions, which when executed by the processor, may cause the processor to receive a plurality of uplink data frames sent by a UE. Each of the plurality of uplink data frames includes a response to an associated downlink test frame received from an associated Li-Fi access point within the set of Li-Fi access points. The response includes one of an ACK and a NACK for the associated downlink test frame and a CQI for the associated Li-Fi access point based on the associated downlink test frame. The stored processor-executable instructions on execution, may further cause the processor to detect presence of the UE in an interference region of the set of Li-Fi access points, based on presence of at least one NACK in at least one of the plurality of uplink frames received from the set of Li-Fi access points. The stored processor-executable instructions on execution, may further cause the processor to attach the UE with a first Li-Fi access point from the set of Li-Fi access points. A CQI associated with the first Li-Fi access point is highest amongst the set of Li-Fi access points. The stored processor-executable instructions on execution, may further cause the processor to schedule data transmission from the set of Li-Fi access points in a mutually exclusive time slot. The UE accepts data received from the attached Li-Fi access point and drops data received from remaining set of Li-Fi access points. The remaining set of Li-Fi access points does not include the first Li-Fi access point.

In yet another embodiment, a UE for managing interference between a set of Li-Fi access points in a Li-Fi communication network is disclosed. The UE includes a processor and a memory communicatively coupled to the processor, wherein the memory stores processor instructions, which when executed by the processor, cause the processor to transmit a plurality of uplink data frames. Each of the plurality of uplink data frames comprises a response to an associated downlink test frame received from an associated Li-Fi access point within the set of Li-Fi access points. The response includes one of a ACK and a NACK for the associated downlink test frame and a Channel Quality Indication (CQI) for the associated Li-Fi access point based on the associated downlink test frame. The processor instructions further cause the processor to attach with a first Li-Fi access point from the set of Li-Fi access points. A CQI associated with the first Li-Fi access point is highest amongst the set of Li-Fi access points. The processor instructions cause the processor to process data transmission scheduled from the set of Li-Fi access points in a mutually exclusive time slot. The processing includes accepting data received from the attached Li-Fi access point and dropping data received from remaining set of Li-Fi access points, wherein the remaining set of Li-Fi access points does not include the first Li-Fi access point.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 illustrates an exemplary downlink data frame transmitted by a Li-Fi access point to a UE, in accordance with some embodiments.

FIG. 6 illustrates an exemplary uplink data frame transmitted by a UE to a Li-Fi access point, in accordance with some embodiments.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
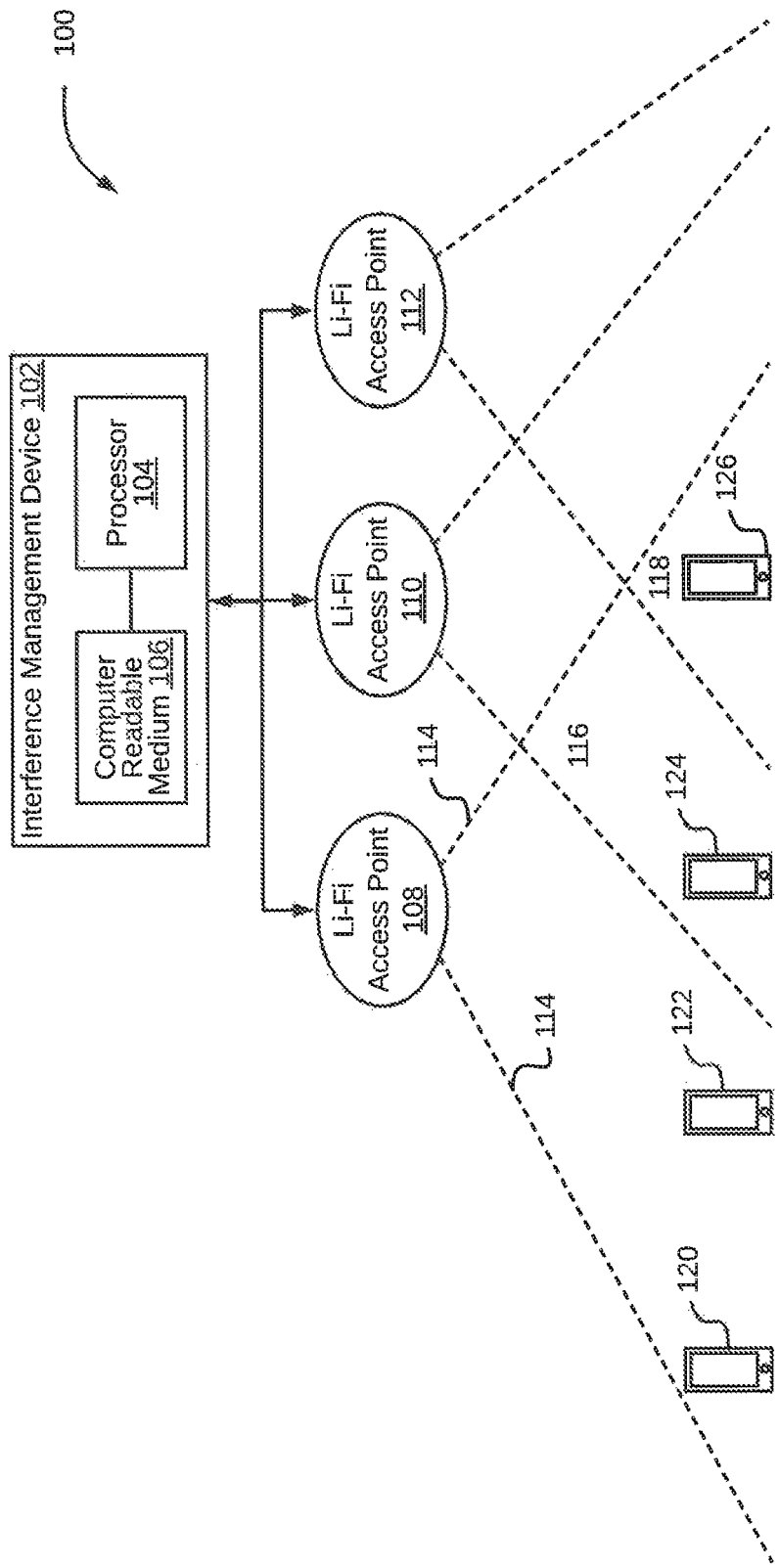
FIG. 1 is a block diagram of a system within an exemplary Light Fidelity (Li-Fi) communication network for managing interference between a set of Li-Fi access points using an interference management device, in accordance with some embodiments.

FIG. 1 illustrates a system 100 within an exemplary Light Fidelity (Li-Fi) communication network for managing interference between a set of Li-Fi access points 108, 110, and, 112 using an interference management device 102, in accordance with some embodiments. In some embodiments, the interference management device 102 may be connected to each of the set of Li-Fi access points 108, 110, and 112. A light signal region 114 is a data signal transmitted by the Li-Fi access point 108. The light signal region 114 may interfere With a data signal transmitted by the Li-Fi access point 110. In such case, a first interference region 116 is created, which is a region of interference between the light signal region 114 and the data signal transmitted by the Li-Fi access point 110. The first interference region 116 may further interfere with a data signal transmitted by the Li-Fi access point 112. In such case, a second interference region 118 is created, which is a region of interference between the first interference region 116 and the data signal transmitted from the Li-Fi access point 112.

The system 100 may further include a plurality of User Equipments (UEs) 120, 122, 124, and 126 that may receive data signals from one or more of the Li-Fi access points 108, 110, and 112 at different locations. As will be appreciated, each of the plurality of UEs may be a computing device with Li-Fi support (for example, a server, a desktop, a laptop, a notebook, a netbook, a tablet, a smartphone, a mobile phone, or the like) or any additional device providing Li-Fi compatibility (for example, a dongle, a Li-Fi sleeve, or the like) to a computing device. The UE 120 and the UE 122 may be located in the light signal region 114. Further, the UE 124 may be located in the first interference region 116 and the UE 126 may be located in the second interference region 118.

The interference management device 102 may include a processors 104 and a computer-readable medium 106. The computer-readable medium 106 may store instructions that, when executed by the processor 104, may cause the processor 104 to manage interference in the Li-Fi communication network, in accordance with various embodiments. The computer-readable medium 106 may also store various data (for example, unique phase of each of the set of Li-Fi access points 108, 110, and 112, information of each of the plurality of UEs 120, 122, 124, and 126 in vicinity of at least one of the set of Li-Fi access points 108, 110, and 112, or the like) that may be captured, processed, and/or required by the interference management device 102. The interference management device 102 may interact with the set of Li-Fi access points 108, 110, and 112 for sending or receiving various data. The interference management device 102 may also interact with the plurality of UEs 120, 122, 124 and 126 for receiving various data, via, one or more of the set of Li-Fi access points 108, 110, and 112.

Figure 2:
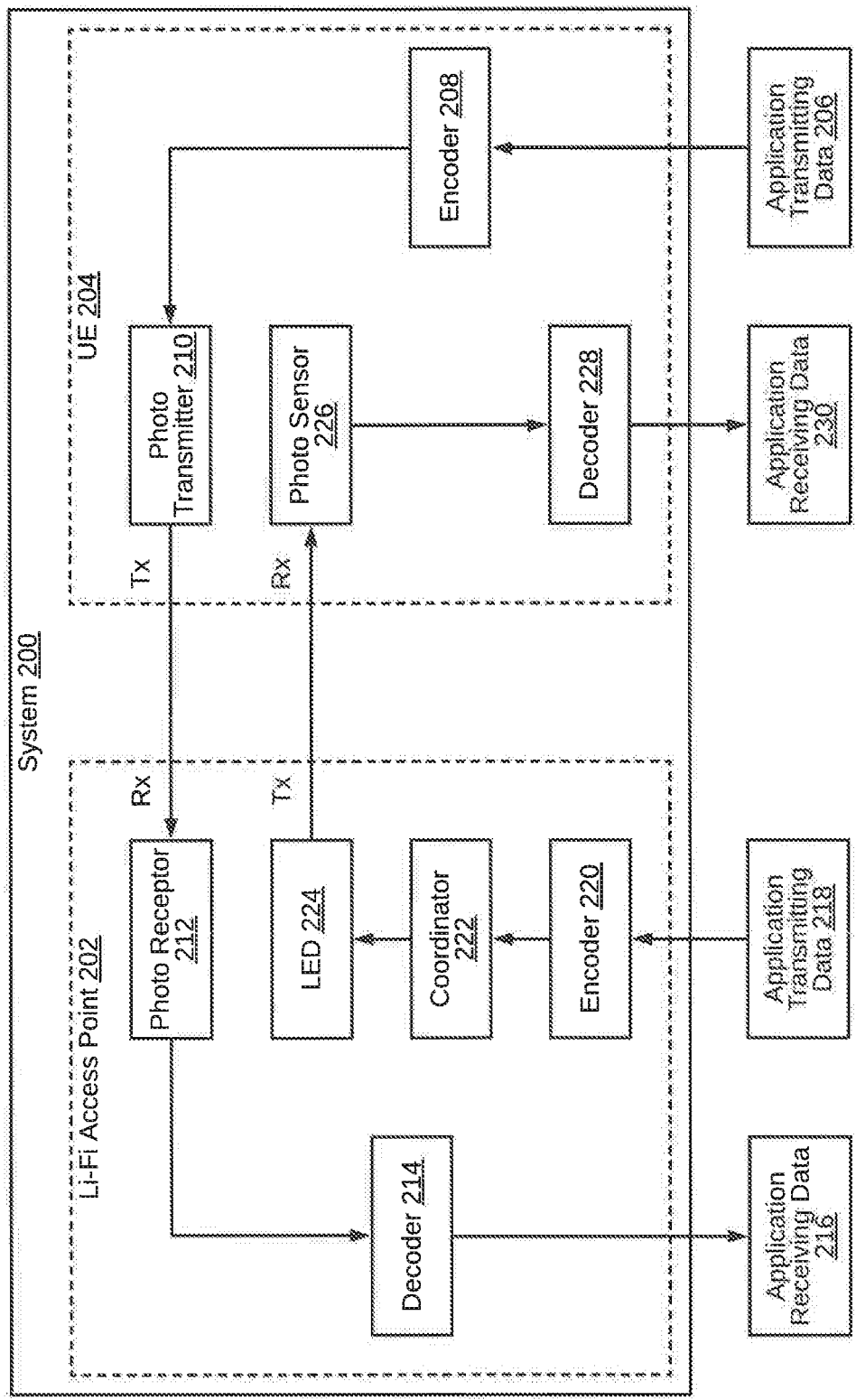
FIG. 2 is a functional block diagram of a system within an exemplary Li-Fi communication network for managing interference between a set of Li-Fi access points, in accordance with some embodiments.

Referring now to FIG. 2, a functional block diagram of a system 200 within an exemplary Li-Fi communication network for managing interference between a set of Li-Fi access points is illustrated, in accordance with some embodiments. The system 200 may include a Li-Fi access point 202 and a UE 204. The Li-Fi access point 202 may include a photo receptor 212, a decoder 214, an encoder 220, a coordinator 222, and an Light Emitting Diode (LED) 224. In some embodiments, the photo receptor 212 may be an Infrared (IR) receiver.

Further, the UE 204 may also include an encoder 208, a photo transmitter 210, a photo sensor 226, and a decoder 228. In some embodiments, the photo transmitter 210 may be an IR transmitter. The LED 224 and the photo sensor 226 may together form a downlink transmission reception system. Further, the photo transmitter 210 and the photo receptor 212 may together form an uplink transmission reception system. The UE 204 may transmit data to the Li-Fi access point 202 through the uplink photo transmitter 210. Application transmitting data 206 and 218 and application receiving data 216 and 230 may interface with the downlink transmission reception system and the uplink transmission reception system respectively, in order to transmit and receive data.

Figure 3:
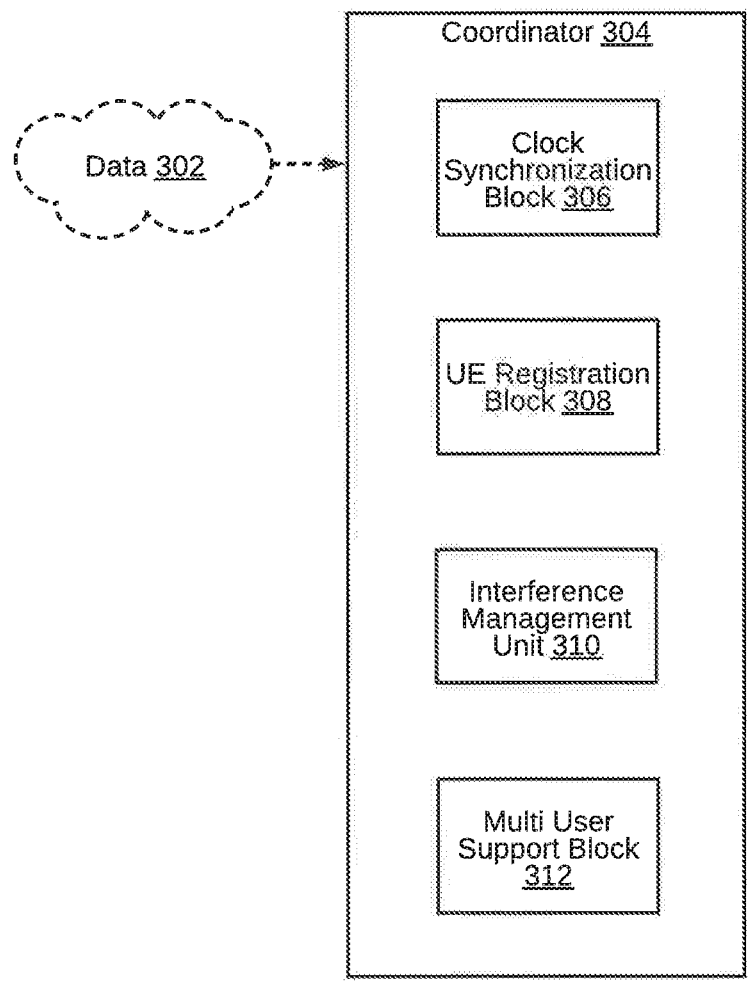
FIG. 3 is a block diagram of a coordinator configured to manage interference between a set of Li-Fi access points, in accordance with some embodiments.

Referring now to FIG. 3, a block diagram of a coordinator 304 configured to manage interference between a set of Li-Fi access points is illustrated, in accordance with some embodiments. The coordinator 304 is analogous to the coordinator 222 and the set of Li-Fi access points, for example, may be the set of Li-Fi access points 108, 110, and 112. The coordinator 304 may include a clock synchronization block 306, a UE registration block 308, an interference management unit 310, and a multi-user support block 312. The coordinator 304 may receive data 302 from either a Li-Fi access point (for example, the Li-Fi access point 108) or a UE (for example, the UE 120), via the Li-Fi access point. The clock synchronization block 306 may assign a unique phase to each of the set of Li-Fi access points. By way of an example, the clock synchronization block 306 may assign a phase 1 to the Li-Fi access point 108, a phase 2 to the Li-Fi access point 110, and a phase 3 to the Li-Fi access point 112.

The UE registration block 308 may receive and store device information from each of the plurality of UEs in vicinity. The device information may be stored to perform various operations, which may include, but are not limited to providing multiple access, seamless handover to another Li-Fi access point, UE attachment, or interference detection.

The interference management unit 310 may perform various techniques for mitigating interference between two or more Li-Fi access points.

The multi-user support block 312 may apply various multiple access techniques for handling of the plurality of UEs in order to provide multi-user support to the plurality of UEs (which may be present both in overlapping and non-overlapping regions). In some exemplary scenarios, the UE 120, the UE 122, and the UE 124 may be located in the light signal region 114 of the Li-Fi access point 108. As will be appreciated, in such scenarios, access to more than one UE may require a multiple access method. In such scenarios for some embodiments, the multiple access method may be an Orthogonality based Multiple Access technique. In such scenarios, the multi-user support block 312 may provide unique orthogonal codes to each of the UE 120, the UE 122, and the UE 124, thereby enabling a multi-user support. For example, while not necessary, orthogonal codes may be generated as [1 1 1 1] for the UE 120, [1 1 −1 −1] for the UE 122, and [1 −1 1 −1] for the UE 124, as specified in the Code generation and allocation section of ETSI TS 125 213 V13.0.0 (2016-01) [UTMS Spreading and Modulation (FDD)]. These orthogonal codes may then be communicated to a corresponding UE. Each of the orthogonal codes may be used to maintain orthogonality between the UEs 120, 122, and 124 that are using a single channel. It may be noted that for such embodiments, the number of UEs may be more than three.

Figure 4:
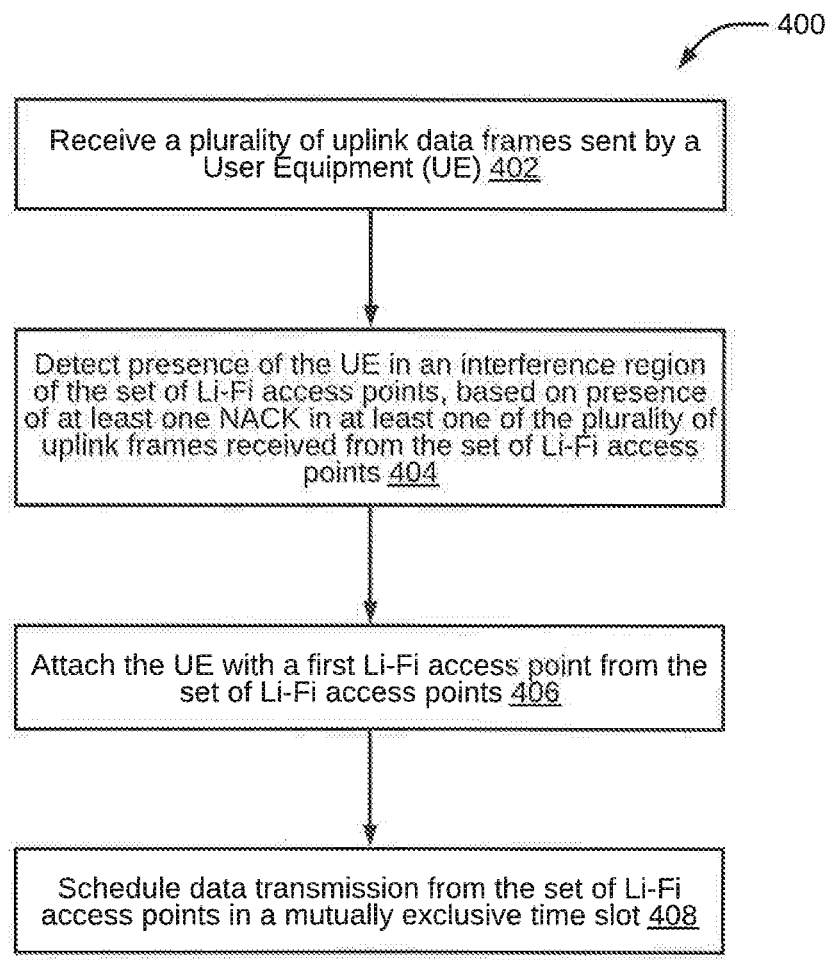
FIG. 4 is a flow diagram of an exemplary control logic for managing interference between a set of Li-Fi access points in a Li-Fi communication network, in accordance with some embodiments.

Referring now to FIG. 4, an exemplary control logic 400 for managing interference between a set of Li-Fi access points in a Li-Fi communication network is disclosed via a flowchart, in accordance with some embodiments. In an embodiment, the control logic 400 may be executed by a system, such as the system 100 or the interference management device 102. As illustrated in the flowchart, the control logic 400 may include receiving a plurality of uplink data frames sent by a UE, at step 402. Each of the plurality of uplink data frames may include a response to an associated downlink test frame received from an associated Li-Fi access point within the set of Li-Fi access points. By way of an example, the UE 124 is associated or attached with the Li-Fi access point 108. It must be noted that the UE 124 is also within the range of data signal transmitted by the Li-Fi access point 110. The Li-Fi access point 108 may send a downlink test frame to the UE 124. In response, the UE 124 may send an uplink data frame. The uplink data frame may be received by the interference management device 102, via the Li-Fi access point 108.

For a given uplink data frame, the response may include one of an Acknowledgement (ACK) and a Negative Acknowledgment (NACK) for the associated downlink test frame. Additionally, the response may include a Channel Quality Indication (CQI) for the associated Li-Fi access point, based on the associated downlink test frame. In continuation of the example given above, the uplink data frame sent by the UE 124 may include an ACK. An ACK in the uplink data frame indicates that data in the downlink test frame sent by the Li-Fi access point 108 was received by the UE 124. Alternatively, the uplink data frame sent by the UE 124 may include a NACK. A NACK in the uplink data frame indicates that data in the downlink test frame sent by the Li-FI access point 108 was not received by the UE 124 or was received with errors. Further, the uplink data frame sent by the UE 124 may include the CQI for the Li-Fi access point 108. This is further explained in detail in conjunction with FIG. 5 and FIG. 6.

The control logic 400 may further include detecting presence of the UE in an interference region of the set of Li-Fi access points, based on presence of at least one NACK in at least one of the plurality of uplink data frames received from the set of Li-Fi access points, at step 404. In continuation of the example above, when the uplink data frame sent by the UE 124 includes a NACK, it may indicate that the UE 124 is present in an interference region, for example, the first interference region 116.

The control logic 400 may further include attaching, at step 406, the UE with a first Li-Fi access point from the set of Li-Fi access points. A CQI associated with the first Li-Fi access point may be the highest amongst the set of Li-Fi access points. In continuation of the example given above, the CQI of the Li-Fi access point 108 is greater than the CQI of the Li-Fi access point 110, thus the UE 124 is attached to the Li-Fi access point 108. This is further explained in detail in conjunction with FIG. 7.

The control logic 400 may further include scheduling, at step 408, data transmission from the set of Li-Fi access points in a mutually exclusive time slot. The data transmission is scheduled, such that, the UE accepts data received from the attached Li-Fi access point and drops data received from remaining set of Li-Fi access points. The remaining set of Li-Fi access points does not include the first Li-Fi access point. In continuation of the example given above, for the Li-Fi access points 108 and 110, data transmission is scheduled, such that, the Li-Fi access points 108 transmits data in a first time slot, while the Li-Fi access points 110 transmits data in a second time slot subsequent to the first time slot. This data transmission through mutually exclusive time slots is carried out iteratively. Since the UE 124 is attached to the Li-Fi access point 108, the UE 124 accepts data received transmitted by the Li-Fi access point 108 and drops the data transmitted by the Li-Fi access point 110. This is further explained in detail in conjunction with FIG. 8.

Referring now to FIG. 5, an exemplary downlink data frame 500 transmitted by a Li-Fi access point to a UE is illustrated, in accordance with some embodiments. The Li-Fi access point, for example, may be the Li-Fi access point 108 and the UE, for example, may be the UE 124. The downlink data frame 500 includes a start frame 502, a cell ID 504, a data 506, a tracking downlink 508, and an end frame 510. The start frame 502 indicates start of the downlink data frame 500 and the cell ID 504 may be an identifier of the Li-Fi access point (for example, an identifier for the Li-Fi access point 108). The cell ID 504 may be in a numerical format and in an embodiment, the coordinator 304 may assign the cell ID 504 to the Li-Fi access point. Further, the tracking downlink 508 may be a test frame sent by the Li-Fi access point to the UE in order to maintaining connectivity with the UE. The tracking downlink 508 may aid in detecting interference between two or more Li-Fi access points. The end frame 510 may indicate end of the downlink data frame 500. The UE may send an uplink data frame in response to the downlink data frame 500. This is further explained in detail in conjunction with FIG. 6.

Referring now to FIG. 6, an exemplary uplink data frame 600 transmitted by a UE to a Li-Fi access point is illustrated, in accordance with some embodiments. The UE, for example, may be the UE 124 and the Li-Fi access point, for example, may be the Li-Fi access point 108. The uplink data frame 600 may be sent from the UE to the Li-Fi access point in response to the downlink data frame 500 sent by the Li-Fi access point to the UE. The uplink data frame 600 may include a start frame 602, a cell ID 604, a UE ID 606, a CQI 608, a tracking uplink 610, and an end frame 612. While the start frame 602 indicates start of the uplink data frame 600, the end frame 612 indicates end of the uplink data frame 600. The cell ID 604 indicates the identifier of the Li-Fi access point. Thus, the value in cell ID 504 and the cell ID 604 would be the same.

After receiving the downlink data frame 500, the UE may calculate the CQI 608 of the Li-Fi access point based on a Packet Error Rate (PER) associated with the Li-Fi access point. By way of an example, when the UE is the UE 124 and the Li-Fi access point is the Li-Fi access point 108, the CQI 608 would represent CQI value associated with the Li-Fi access point 108. Further, the tracking uplink 610 may include either an ACK or a NACK. The ACK may indicate that data transmitted by the Li-Fi access point was received without errors and that the UE is not experiencing any interference. Similarly, the NACK may indicate that data transmitted by the Li-Fi access point was received with errors and that the UE may be experiencing interference. The tracking uplink 610 may be sent by the UE to the Li-Fi access point in order to maintain connectivity.

Figure 7:
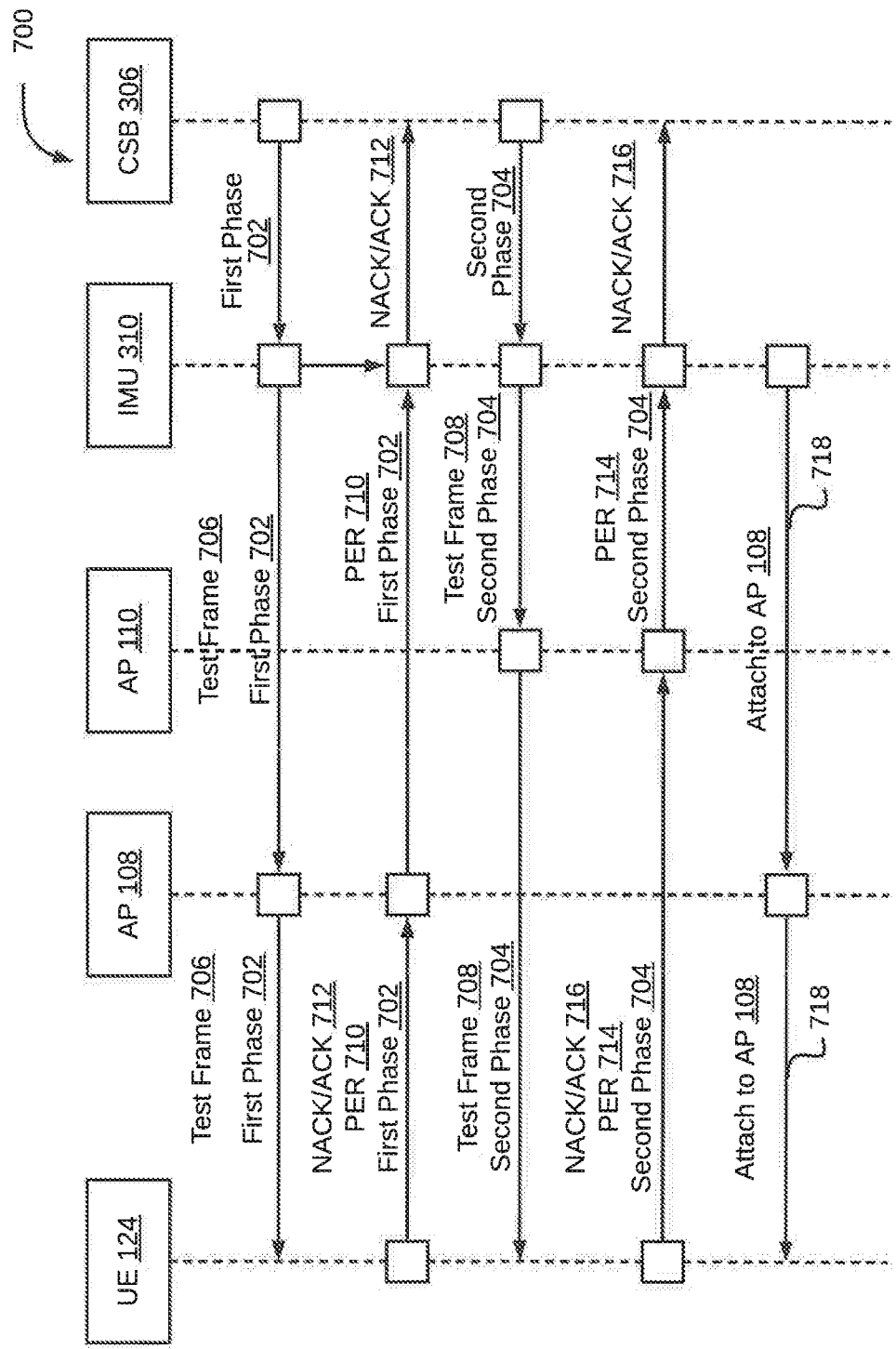
FIG. 7 illustrates an exemplary communication flow of an exemplary mechanism of attaching a UE with a first Li-Fi access point amongst two Li-Fi access points, in accordance with some embodiments.

Referring now to FIG. 7, a communication flow 700 of an exemplary mechanism of attaching a UE with a first Li-Fi access point amongst two Li-Fi access points is illustrated, in accordance with some embodiments. The communication flow 700 may include the UE 124, the Li-Fi access point (AP) 108, the Li-Fi access point (AP) 110, the interference management unit (IMU) 310, and the clock synchronization block (CSB) 306. The CSB 306 assigns a first phase 702 to the AP 108 and a second phase 704 to the AP 110. Upon detection of interference between the APs 108 and 110 by the coordinator 304, the IMU 310 may initiate interference mitigation. To this end, the IMU 310 may send a test frame 706 to the AP 108 and a test frame 708 to the AP 110. The AP 108 may further send the test frame 706 to the UE 124 through the first phase 702. In a similar manner, the AP 110 may further send the test frame 708 to the UE 124 through the second phase 704. In some embodiments, the test frame 706 and the test frame 708 may be similar to the downlink data frame 500.

The UE 124 may receive the test frame 702 and may evaluate a PER 710. The UE 124 may send the PER 710 along with a NACK/ACK signal 712 to the AP 108. The AP 108 may send the PER 710 to the IMU 310 and the NACK/ACK signal 712 to the CSB 306. A similar sequence of steps may be applied for the AP 110 by the UE 124 to obtain and send a PER 714 and a NACK/ACK signal 716 to the IMU 310 and to the CSB 306, respectively. In some embodiments, the NACK/ACK signals 712 and 714 may be a part of the uplink data frame 600.

After receiving the PERs 710 and 714, the IMU 310 may determine that the PER 710 is less than the PER 714. Based on this, the IMU 310, at 716, may initiate attaching the UE 124 with the AP 108. In some embodiments, PER may be used to estimate a CQI. In such embodiments, instead of PERs 710 and 714, respective CQI values may be shared by the UE 124. Additionally, in such embodiment, the IMU 310 may attach the UE 124, at 718, with the AP 108, when a first CQI corresponding to the PER 710 is greater than a second CQI corresponding to the PER 714. Once the UE 124 is attached to the AP 108, the UE 124 may accept data transmitted by the AP 108 and may drop the data transmitted by the AP 110. This is further explained in detail in conjunction with FIG. 8.

Figure 8:
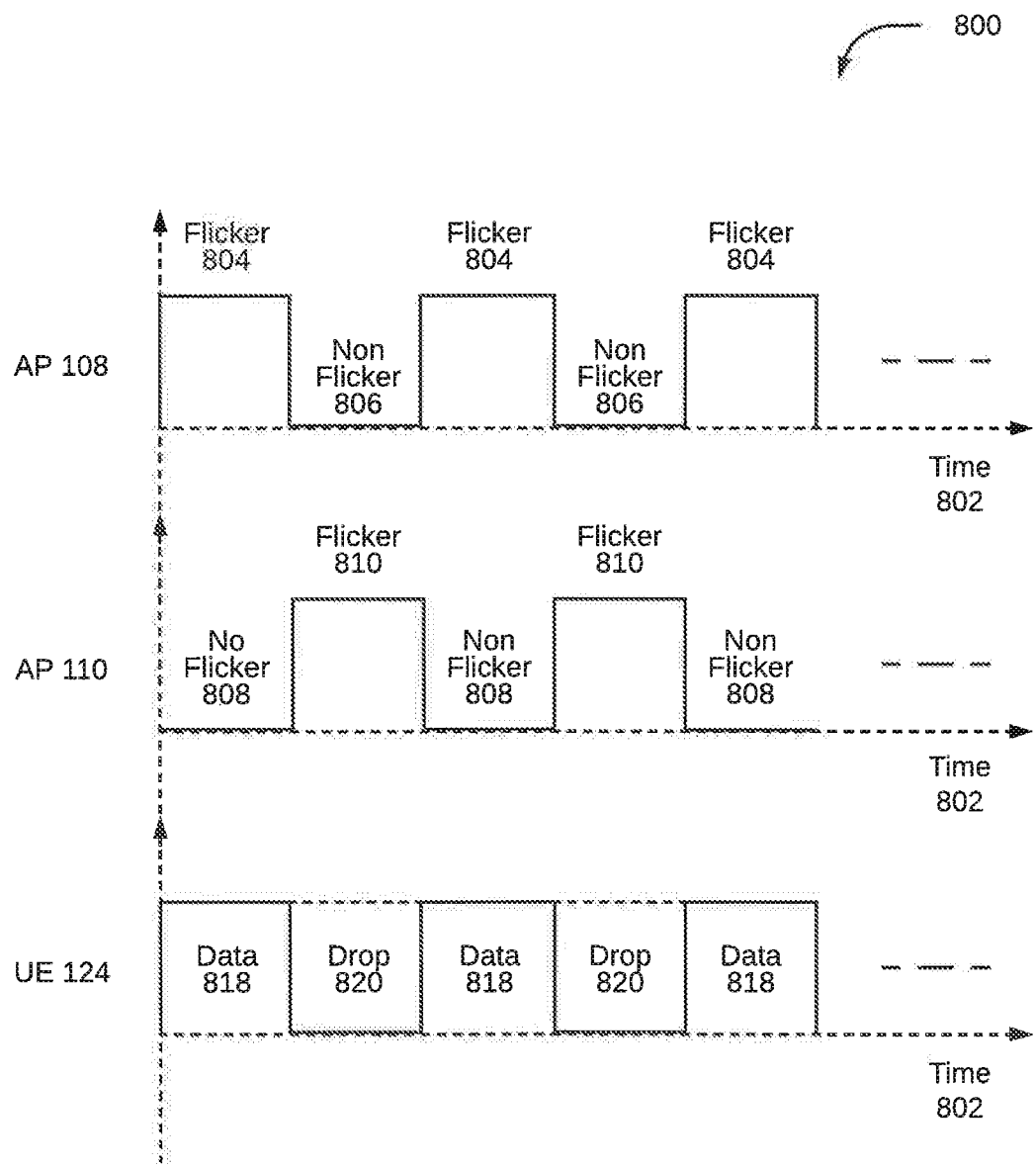
FIG. 8 illustrates a graphical representation of scheduling transmission of data from a first Li-Fi access point and a second Li-Fi access point in a mutually exclusive time slot and reception of the data by a UE, in accordance with some embodiments.

Referring now to FIG. 8, a graphical representation 800 of scheduling transmission of data from the AP 108 and the AP 110 in a mutually exclusive time slot and reception of the data by the UE 124 is illustrated, in accordance with some embodiments. The graphical representation 800 may be an amplitude-time graph for each of the AP 108 and the AP 110. In some embodiments, the IMU 310 may instruct the AP 108 and the AP 110 to transmit data signals according to the unique phase allocated to each of the AP 108 and the AP 110 by the CSB 306 over a time 802.

In some embodiments, the AP 108 may transmit a data signal depicted as a flicker 804 or a non-flicker 806 on the graphical representation 800. In such embodiments, the non-flicker 806 may be a time period of a constant intensity whereas the flicker 804 may be a time period of a lower or higher light intensity. As an example, the transmitting LED could be supplied with an average voltage (Vavg). When a bit pattern 1 is detected, the LED transmits with higher voltage (Vavg+v) for the bit duration and when a bit pattern 0 is detected, the LED transmits with a lower voltage (Vavg−v) for the bit duration. In a similar manner, in such embodiments, data signal of the AP 110 may be depicted as a flicker 808 or a non-flicker 810 on the graphical representation 800. Referring back to FIG. 7, and in an exemplary scenario, the CQI of the AP 108 may be higher than the CQI of the AP 110. In such a scenario, the UE 124 may accept the data signal from the AP 108 and reject the data signals from the AP 110. As will be appreciated, the decoder 228 of the system 200 may aid the UE 124 in decoding the data signal received from the AP 108.

Figure 9:
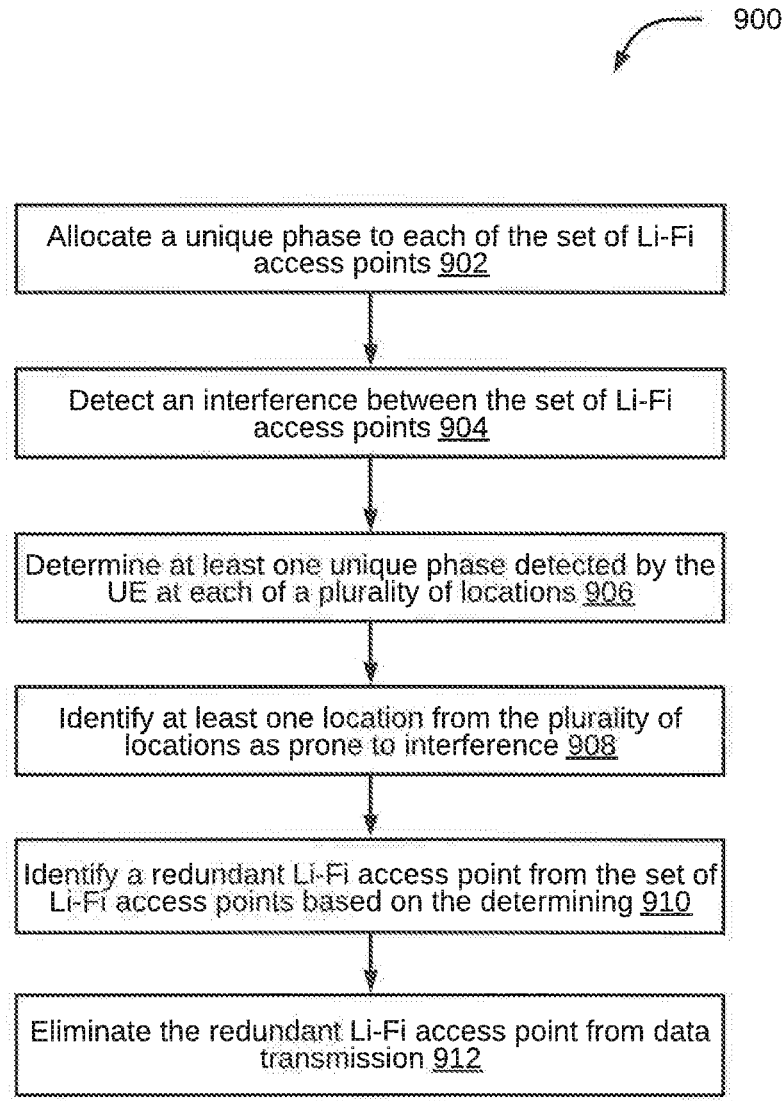
FIG. 9 is a flow diagram of an exemplary method for identifying and eliminating a redundant Li-Fi access point from data transmission, in accordance with some embodiments.

Referring now to FIG. 9, an exemplary method 900 for identifying and eliminating a redundant Li-Fi access point from data transmission is depicted, in accordance with some embodiments. The redundant Li-Fi access point may be eliminated from a set of Li-Fi access points (for example, the set of Li-Fi access points 108, 110, and 112). The method 900 may include allocating a unique phase to each of the set of Li-Fi access points, at step 902. Further, the method 900 may include detecting an interference between the set of Li-Fi access points, at step 904. At step 906, at least one unique phase may be determined as detected by the UE at each of a plurality of locations. At step 908, at least one location from the plurality of locations may be identified as prone to interference. At the at least one location, the UE may detect two or more unique phases, thereby indicating interference. At step 910, a redundant Li-Fi access point may be identified from the set of Li-Fi access points based on the step 906. For the redundant Li-Fi access point, at each of the plurality of locations, the UE detects a unique phase allocated to the redundant Li-Fi access point and at least one unique phase allocated to a non-redundant Li-Fi access point from the set of Li-Fi access points. At step 912, the redundant Li-Fi access point may be eliminated from data transmission. In some embodiments, the redundant Li-Fi access point may be used only as an illumination source.

Referring back to FIG. 1, in an exemplary scenario, data signal from the Li-Fi access point 110 may receive interference from the data signals of Li-Fi access points 108 and 112 at each location within the Li-Fi communication network. Moreover, the region covered by the data signal of the Li-Fi access point 110 is also covered either by the Li-Fi access point 108 or the Li-Fi access point 112. In such a scenario, the Li-Fi access point 110 may be considered as a redundant Li-Fi access point and may thus be eliminated and may only be used as an illumination source. As a result of this elimination, interference mitigation and management only needs to be performed for the Li-Fi access points 108 and 112.

Figures 10, 11:
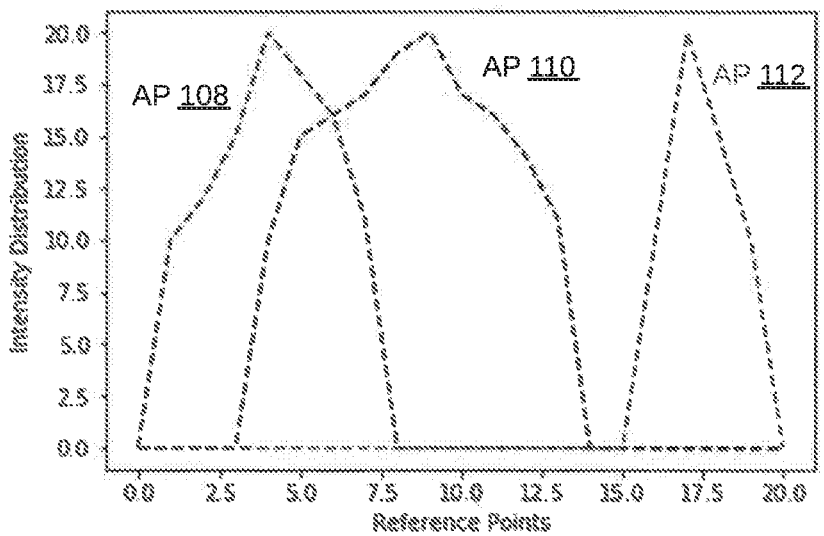
FIG. 10 is an exemplary phase interference table for detecting interference between a set of Li-Fi access points, in accordance with some embodiments.
FIG. 11 illustrates an exemplary graphical representation for detecting interference between a set of Li-Fi access points, in accordance with some embodiments.

Referring now to FIG. 10, an exemplary phase interference table 1000 for detecting interference between a set of Li-Fi access points is illustrated, in accordance with some embodiments. The phase interference table 1000 includes results of an exemplary experimental setup further including the UE 124 and three Li-Fi access points, i.e., the AP 108, the AP 110, and the AP 112. Further, the phase interference table 1000 includes observational values for a UE ID 1002 of the UE 124, a light intensity 1004 (in lux) of each of the APs 108, 110, and 112 at varying locations of the UE 124, and a phase 1006 allocated to each of the APs 108, 110, and 112, by the CSB 306.

In some embodiments, the values of the phase 1006 for each of the APs 108, 110, and 112, may be detected by the UE 124 and may be transferred to the IMU 310. In some embodiments, the phase 1006 of the APs 108, 110, and 112 may be $\varphi1$, $\varphi2$, and $\varphi3$, respectively. In some exemplary scenarios of such embodiments, a location of the UE 124 may be in a region of interference between at least two APs from the APs 108, 110, and 112. The interference, for example, may be between the AP 108 and the AP 110. In such scenarios of such embodiments, the UE 124 may detect the phase 1006 values of the at least two APs, thereby detecting interference between the at least two APs. In some embodiments, the phase 1006 values may further be used to detect a redundant Li-Fi access point. In some exemplary scenarios of such embodiments, a phase value for a redundant Li-Fi access point may always be received along with one of the three Li-Fi access points. In such scenarios, such embodiments may eliminate the redundant Li-Fi access point from data transmission. By way of an example and referring to the table 1000, $\varphi2$ assigned to the AP 110 is always received along with $\varphi1$ assigned to the AP 108. Thus, the AP 110 may be identified as a redundant Li-Fi access point.

Referring now to FIG. 11, an exemplary graphical representation 1100 for detecting an interference between a set of Li-Fi access points is illustrated, in accordance with some embodiments. The graphical representation 1100 includes a line chart of the phase interference table 1000. Further, the graphical representation 1100 includes an intensity distribution of each of the APs 108, 110, and 112 on the y-axis and a plurality of corresponding reference points on the x-axis. Further, the graphical representation 1100 includes line representations for the light intensity 1004 for each of the APs 108, 110, and 112.

Figure 12:
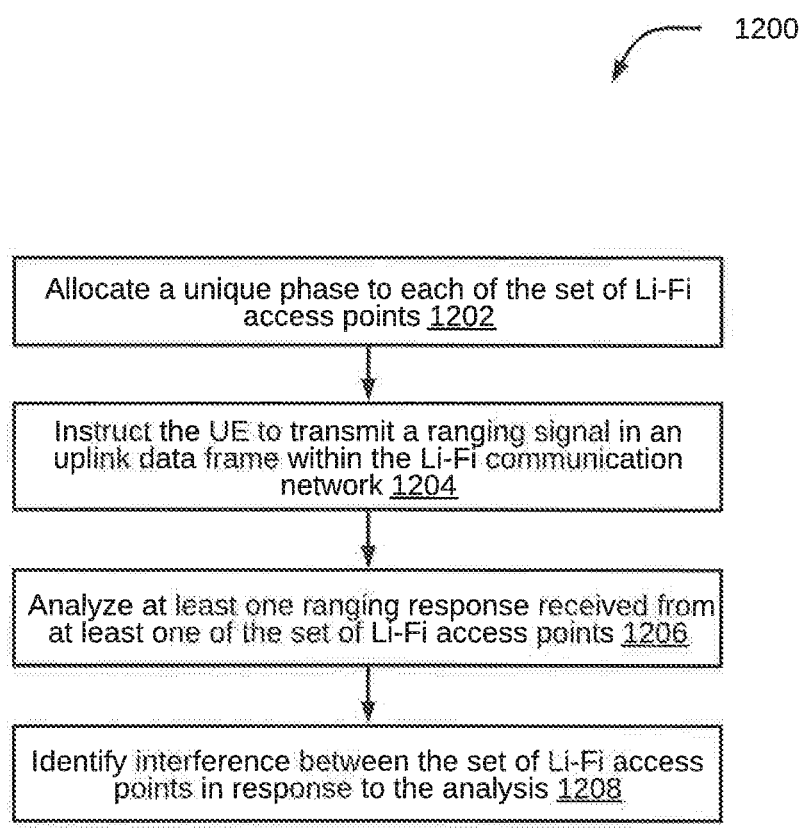
FIG. 12 is a flow diagram of an exemplary method for identifying interference between a set of Li-Fi access points based on ranging response received by a UE, in accordance with some embodiments.

Referring now to FIG. 12, a flow diagram of an exemplary method 1200 for identifying interference between a set of Li-Fi access points based on ranging response received by a UE is illustrated, in accordance with some embodiments. At step 1202, a unique phase may be allocated to each of the set of Li-Fi access points. At step 1204, the UE may be instructed to transmit a ranging signal in an uplink data frame within the Li-Fi communication network. In response to the ranging signal, at least one of the set of Li-Fi access points may send at least one ranging response. At step 1206, the at least one ranging response received from at least one of the set of Li-Fi access points may be analyzed. Each of the at least one ranging response may include an identifier of an associated Li-Fi access point. Based on the analysis of the at least one ranging response, interference between the at least one of the set of Li-Fi access points may be identified, at step 1208, between the set of Li-Fi access points.

Figure 13:
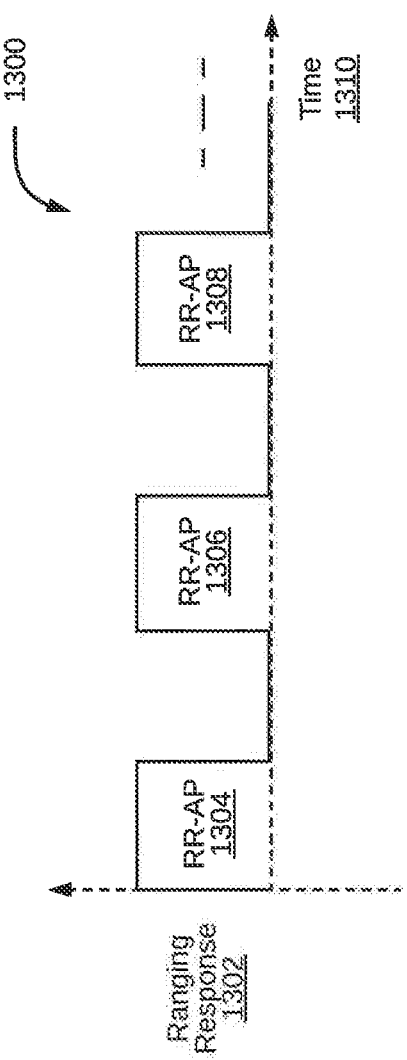
FIG. 13 illustrates an exemplary graphical representation of receipt of a ranging response from each of the set of Li-Fi access points by a UE, in accordance with some embodiments.

Referring now to FIG. 13, an exemplary graphical representation 1300 of receipt of a ranging response from each of a set of Li-Fi access points by a UE is illustrated, in accordance with some embodiments. The graphical representation 1300 may include a measure for the ranging response on the y-axis 1302 and time on the x-axis 1310. In some embodiments, the measure for the ranging response may be an amplitude. Further, the graphical representation 1300 may include values for the ranging responses RR-AP 1304 for a first Li-Fi access point, RR-AP 1306 for a second Li-Fi access point, and RR-AP 1308 for a third Li-Fi access point. It may be noted that each of the ranging responses RR-AP 1304, RR-AP 1306, and RR-AP 1308 may be transmitted in a single phase, one at a time for better identification by the UE. It may also be noted that the ranging responses RR-AP 1304, RR-AP 1306, and RR-AP 1308 may provide information to the coordinator 304 related to visibility of the set of Li-Fi access points for the UE.

Figure 14:
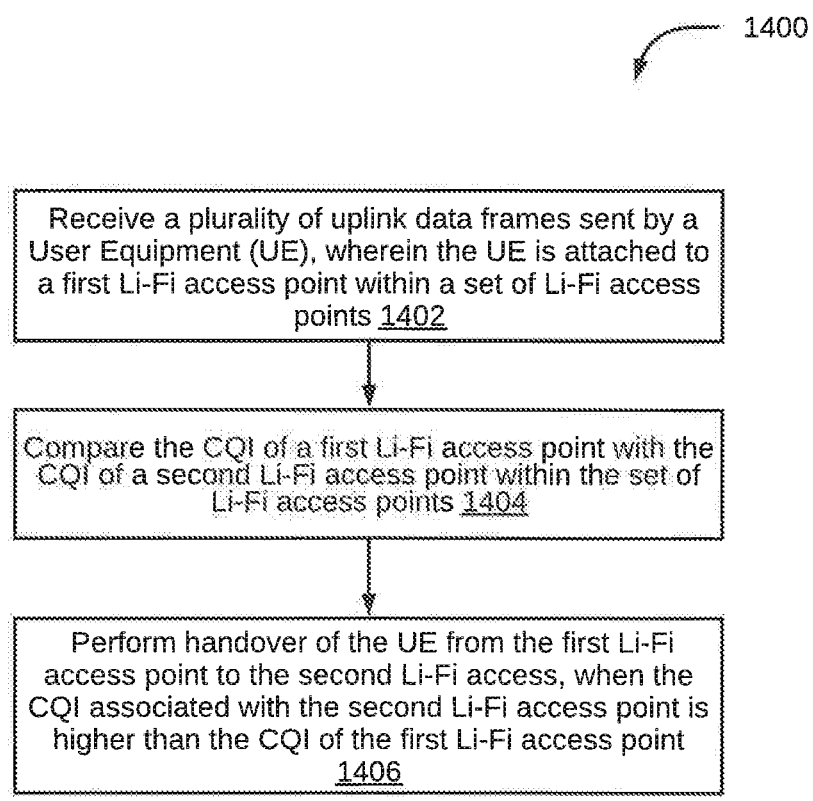
FIG. 14 is a flow diagram of an exemplary method for performing handover of a UE from a first Li-Fi access point to a second Li-Fi access point within a set of Li-Fi access points, in accordance with some embodiments.

Referring now to FIG. 14, an exemplary method 1400 for performing handover of a UE from a first Li-Fi access point to a second Li-Fi access point within a set of Li-Fi access points is illustrated, in accordance with some embodiments. The UE may be attached to the first Li-Fi access point. By way of an example, the UE may be the UE 124, the first Li-Fi access point may be the Li-Fi access point 108, the second Li-Fi access point may be the Li-Fi access point 110. In this example, the UE 124 may be attached to the Li-Fi access point 108. At step 1402, a plurality of uplink data frames (for example, the uplink data frame 500) sent by a UE may be received, for example, by the interference management device 102. Based on the plurality of uplink data frames received from the UE, at step 1404, the CQI of the first Li-Fi access point may be compared with the CQI of the second Li-Fi access point. It may be determined that the CQI of the second Li-Fi access point is higher than the CQI of the first Li-Fi access point. Thus, at step 1406, handover of the UE from the first Li-Fi access point to a second Li-Fi access point may be performed. This is further explained in detail in conjunction with FIG. 15.

Figure 15:
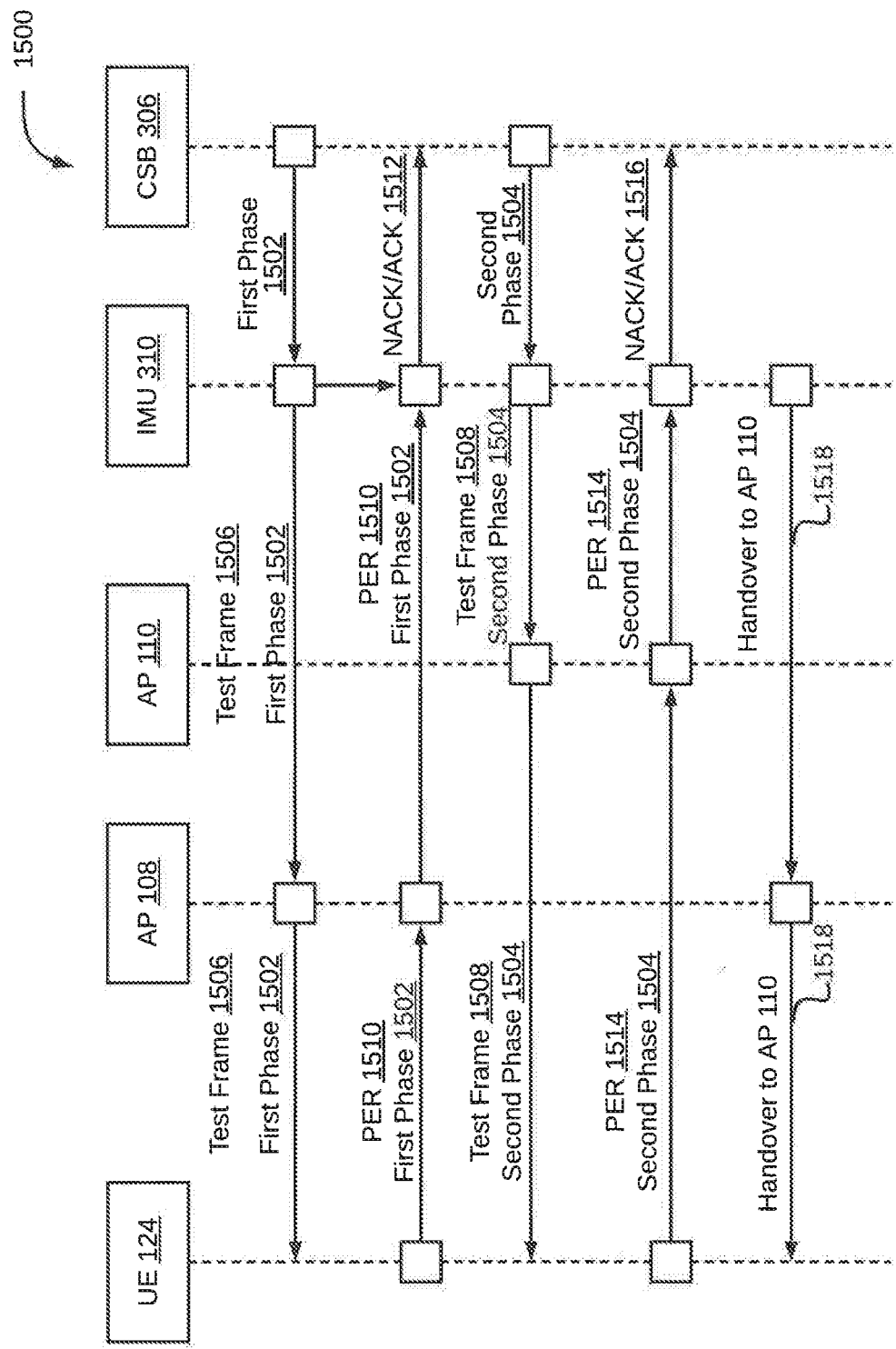
FIG. 15 illustrates an exemplary communication flow for performing handover of a UE from a first Li-Fi access point to a second Li-Fi access point within a set of Li-Fi access points, in accordance with some embodiments.

Referring now to FIG. 15, an exemplary communication flow 1500 for performing handover of a UE from a first Li-Fi access point to a second Li-Fi access point within a set of Li-Fi access points, in accordance with some embodiments. The mechanism 1500 may include the UE 124, the AP 108, the AP 110, the IMU 310, and the CSB 306. The CSB 306 assigns a first phase 1502 to the AP 108 and a second phase 1504 to the AP 110. As discussed in FIG. 14, the UE 124 may initially be attached to the AP 108, as the CQI of the AP 108 at the time of initial evaluation was greater than the CQI of the AP 110. Even after the UE 124 is attached to the AP 108, the IMU 310 may continue sending test frames from each of the AP 108 and the AP 110 to the UE 124 for dynamic evaluation of CQI of the AP 108 and the AP 110.

To this end, the IMU 310 may send a test frame 1506 to the AP 108 and a test frame 1508 to the AP 110. The AP 108 may further send the test frame 1506 to the UE 124 through the first phase 1502. In a similar manner, the AP 110 may further send the test frame 1508 to the UE 124 through the second phase 1504. In some embodiments, the test frame 1506 and the test frame 1508 may be similar to the downlink data frame 500.

The UE 124 may receive the test frame 1502 and may evaluate a PER 1510. The UE 124 may send the PER 1510 along with a NACK/ACK signal 1512 to the AP 108. The AP 108 may send the PER 1510 to the IMU 310 and the NACK/ACK signal 1512 to the CSB 306. A similar sequence of steps may be applied for the AP 110 by the UE 124 to obtain and send a PER 1514 and a NACK/ACK signal 1516 to the IMU 310 and to the CSB 306, respectively. In some embodiments, the NACK/ACK signals 1512 and 1514 may be a part of the uplink data frame 600.

After receiving the PERs 1510 and 1514, the IMU 310 may determine that the PER 1514 is less than the PER 1516. Based on this, the IMU 310 at 1516, may perform handover of the UE 124 from the AP 108 to the AP 110. In some embodiments, PER may be used to estimate a CQI). In such embodiments, instead of PERs 1510 and 1514, respective CQI values may be shared by the UE 124. Additionally, in such embodiment, the IMU 310 may handover the UE 124, at 1518, from the AP 108 to the AP 110, when a first CQI corresponding to the PER 1510 is greater than a second CQI corresponding to the PER 1514.

As will be appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will be appreciated by those skilled in the art, the techniques described in the various embodiments discussed above are not routine, or conventional, or well understood in the art. As mentioned earlier, the techniques include determining visibility of a set of Li-Fi access points for a UE, eliminating redundant Li-Fi access points, detecting interference between the set of Li-Fi access points, sending data from each of the set of Li-Fi access points in a time shift manner, evaluating CQI of each of the set of Li-Fi access points for the UE, and attaching to a Li-Fi access point with the highest CQI. Further, the techniques may provide for dynamic evaluation of CQI of the set of Li-Fi access points for the UE and a handover of connection to a second Li-Fi access point with a higher CQI. Further, techniques may provide for a multiple user support using multiple access method. Typically, when a UE moves from one Li-Fi access point to another, connectivity persists as long as the UE stays in vicinity of modulated light. It may be noted that if there is a region where modulated lights from one or more adjacent Li-Fi access points interfere, the UE may stop receiving data. Further, it may be noted that there is no method to detect physical cell IDs of the Li-Fi access points associated to the UE in interference region.

As will also be appreciated by those skilled in the art, current Li-Fi systems lack the mechanism to overcome the interference caused by the adjacent Li-Fi access points modulated using a white light (single carrier). The techniques described above provide for managing interference between a set of Li-Fi access points in a Li-Fi communication network. In particular, the above techniques provide for detecting and mitigating interference between the set of Li-Fi access points by allocating a unique phase to each of the set of Li-Fi access points, transmitting data signals from each of the set of Li-Fi access points in a time shift manner, dynamically evaluating CQI of each of the Li-Fi access points for a UE, and attaching/handing over the UE to a Li-Fi access point with the highest CQI.

The specification has described managing interference between a set of Li-Fi access points in a Li-Fi communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing interference between a set of Light Fidelity (Li-Fi) access points in a Li-Fi communication network, the method comprising:
    receiving, by an interference management device, a plurality of uplink data frames sent by a User Equipment (UE), wherein each of the plurality of uplink data frames comprises a response to an associated downlink test frame received from an associated Li-Fi access point within the set of Li-Fi access points, and wherein the response comprises:
        one of an Acknowledgement (ACK) and a Negative Acknowledgment (NACK) for the associated downlink test frame; and
        a Channel Quality Indication (CQI) for the associated Li-Fi access point based on the associated downlink test frame;
    detecting, by the interference management device, presence of the UE in an interference region of the set of Li-Fi access points, based on presence of at least one NACK in at least one of the plurality of uplink frames received from the set of Li-Fi access points;
    attaching, by the interference management device, the UE with a first Li-Fi access point from the set of Li-Fi access points, wherein a CQI associated with the first Li-Fi access point is highest amongst the set of Li-Fi access points; and
    scheduling, by the interference management device, data transmission from the set of Li-Fi access points in a mutually exclusive time slot, wherein the UE accepts data received from the attached Li-Fi access point and drops data received from remaining set of Li-Fi access points, and wherein the remaining set of Li-Fi access points does not include the first Li-Fi access point.

2. The method of claim 1 further comprising performing handover of the UE from the first Li-Fi access point to a second Li-Fi access point within the set of Li-Fi access points, wherein a CQI associated with the second Li-Fi access point is highest amongst the set of Li-Fi access points.

3. The method of claim 1, further comprising assigning a plurality of orthogonal codes to a plurality of UEs comprising the UE in the Li-Fi communication network, wherein each of the plurality of UEs communicate with at least one of the set of Li-Fi access points.

4. The method of claim 1 further comprising allocating a unique phase to each of the set of Li-Fi access points.

5. The method of claim 4 further comprising detecting an interference between the set of Li-Fi access points, wherein a plurality of Li-Fi access points comprises the set of Li-Fi access points.

6. The method of claim 5, wherein detecting the interference comprises:
    determining at least one unique phase detected by the UE at each of a plurality of locations; and
    identifying at least one location from the plurality of locations as prone to interference, wherein the UE detects two or more unique phases at the at least one location.

7. The method of claim 6, further comprising:
    identifying a redundant Li-Fi access point from the set of Li-Fi access points based on the determining, wherein at each of the plurality of locations, the UE detects a unique phase allocated to the redundant Li-Fi access point and at least one unique phase allocated to a non-redundant Li-Fi access point from the set of Li-Fi access points; and
    eliminating the redundant Li-Fi access point from data transmission.

8. The method of claim 5, wherein detecting the interference comprises:
    instructing the UE to transmit a ranging signal in an uplink data frame within the Li-Fi communication network;
    analyzing at least one ranging response received from at least one of the set of Li-Fi access points, wherein each of the at least one ranging response comprises an identifier of an associated Li-Fi access point; and
    identifying interference between the set of Li-Fi access points in response to the analysis.

9. The method of claim 1, wherein the CQI for the associated Li-Fi access point is calculated based on Packet Error Ration (PER) of the associated Li-Fi access point.

10. A system for managing interference in a Light Fidelity (Li-Fi) communication network, the system comprising:
    a set of Li-Fi access points;
    a plurality of User Equipments (UEs);
    a processor; and
    a computer-readable medium communicatively coupled to the processor, wherein the computer-readable medium stores processor instructions, which when executed by the processor, cause the processor to:
        receive a plurality of uplink data frames sent by a User Equipment (UE) from the plurality of UEs, wherein each of the plurality of uplink data frames comprises a response to an associated downlink test frame received from an associated Li-Fi access point within the set of Li-Fi access points, and wherein the response comprises:
- one of an Acknowledgement (ACK) and a Negative Acknowledgment (NACK) for the associated downlink test frame; and
- a Channel Quality Indication (CQI) for the associated Li-Fi access point based on the associated downlink test frame;

detect presence of the UE in an interference region of the set of Li-Fi access points, based on presence of at least one NACK in at least one of the plurality of uplink frames received from the set of Li-Fi access points;

attach the UE with a first Li-Fi access point from the set of Li-Fi access points, wherein a CQI associated with the first Li-Fi access point is highest amongst the set of Li-Fi access points; and schedule data transmission from the set of Li-Fi access points in a mutually exclusive time slot, wherein the UE accepts data received from the attached Li-Fi access point and drops data received from remaining set of Li-Fi access points, and wherein the remaining set of Li-Fi access points does not include the first Li-Fi access point.

11. The system of claim 10, wherein the processor instructions further cause the processor to perform handover of the UE from the first Li-Fi access point to a second Li-Fi access point within the set of Li-Fi access points, wherein a CQI associated with the second Li-Fi access point is highest amongst the set of Li-Fi access points.

12. The system of claim 10, wherein the processor instructions further cause the processor to assign a plurality of orthogonal codes to a plurality of UEs comprising the UE in the Li-Fi communication network, wherein each of the plurality of UEs communicate with at least one of the set of Li-Fi access points.

13. The system of claim 10, wherein the processor instructions further cause the processor to allocate a unique phase to each of the set of Li-Fi access points.

14. The system of claim 13, wherein the processor instructions further cause the processor to detect an interference between the set of Li-Fi access points, wherein a plurality of Li-Fi access points comprises the set of Li-Fi access points.

15. The system of claim 14, wherein to detect the interference, the processor instructions further cause the processor to:
- determine at least one unique phase detected by the UE at each of a plurality of locations; and
- identify at least one location from the plurality of locations as prone to interference, wherein the UE detects two or more unique phases at the at least one location.

16. The system of claim 15, wherein the processor instructions further cause the processor to:
- identify a redundant Li-Fi access point from the set of Li-Fi access points based on the determining, wherein at each of the plurality of locations, the UE detects a unique phase allocated to the redundant Li-Fi access point and at least one unique phase allocated to a non-redundant Li-Fi access point from the set of Li-Fi access points; and
- eliminate the redundant Li-Fi access point from data transmission.

17. The system of claim 14, wherein to detect the interference, the processor instructions further cause the processor to:
- instruct the UE to transmit a ranging signal in an uplink data frame within the Li-Fi communication network;
- analyze at least one ranging response received from at least one of the set of Li-Fi access points, wherein each of the at least one ranging response comprises an identifier of an associated Li-Fi access point; and
- identify interference between the set of Li-Fi access points in response to the analysis.

18. The system of claim 10, wherein the CQI for the associated Li-Fi access point is calculated based on Packet Error Ration (PER) of the associated Li-Fi access point.

19. A User Equipment (UE) for managing interference between a set of Light Fidelity (Li-Fi) access points in a Li-Fi communication network, the UE comprising:
- a processor;
- a memory communicatively coupled to the processor, wherein the memory stores processor instructions, which when executed by the processor, cause the processor to:
  - transmit a plurality of uplink data frames, wherein each of the plurality of uplink data frames comprises a response to an associated downlink test frame received from an associated Li-Fi access point within the set of Li-Fi access points, and wherein the response comprises:
    - one of an Acknowledgement (ACK) and a Negative Acknowledgment (NACK) for the associated downlink test frame; and
    - a Channel Quality Indication (CQI) for the associated Li-Fi access point based on the associated downlink test frame;
  - attach with a first Li-Fi access point from the set of Li-Fi access points, wherein a CQI associated with the first Li-Fi access point is highest amongst the set of Li-Fi access points; and
  - process data transmission scheduled from the set of Li-Fi access points in a mutually exclusive time slot, wherein to process the data transmission, the processor instructions cause the processor to;
    - accept data received from the attached Li-Fi access point; and
    - drop data received from remaining set of Li-Fi access points, wherein the remaining set of Li-Fi access points does not include the first Li-Fi access point.

* * * * *